(12) United States Patent
Madson

(10) Patent No.: US 8,143,392 B2
(45) Date of Patent: Mar. 27, 2012

(54) METHOD FOR THE EXTRACTION OF STARCH FROM CORN

(76) Inventor: Michael Madson, Clear Lake, IA (US)

(*) Notice: Subject to any disclaimer, the term of this patent is extended or adjusted under 35 U.S.C. 154(b) by 389 days.

(21) Appl. No.: 12/497,271

(22) Filed: Jul. 2, 2009

(65) Prior Publication Data

US 2010/0016576 A1    Jan. 21, 2010

Related U.S. Application Data

(60) Provisional application No. 61/077,547, filed on Jul. 2, 2008.

(51) Int. Cl.
  *C07H 1/06* (2006.01)
  *C07H 1/08* (2006.01)
(52) U.S. Cl. ......... 536/128; 536/102; 536/124; 536/127
(58) Field of Classification Search ........................ None
  See application file for complete search history.

(56) References Cited

OTHER PUBLICATIONS

Mistry et al. Cereal Chemistry (1992), vol. 69, pp. 296-303.*
Eckhoff et al. Cereal Chemistry (1999), vol. 76, pp. 96-99.*
Abdelrahman et al. Cereal Chemistry (1984), vol. 61, pp. 232-235.*

* cited by examiner

*Primary Examiner* — Patrick Lewis
(74) *Attorney, Agent, or Firm* — Zarley Law Firm, P.L.C.

(57) ABSTRACT

A method of extracting starch from corn. The method comprises steeping ground corn in a mixture of ammonium hydroxide and water, for a period of between 45 minutes and 20 hours wherein the mixture has a pH level between about 11.3 and 11.4. This method provides the advantage of extracting starch from corn with higher yields in less time.

6 Claims, 2 Drawing Sheets

METHOD FOR THE EXTRACTION OF STARCH FROM CORN

CROSS REFERENCE TO RELATED APPLICATION

This application claims the benefit of U.S. Provisional Application No. 61/007,547 filed Jul. 2, 2008.

FIELD OF THE INVENTION

This invention is directed to a method of extracting starch from corn, and more particularly to the use of ammonium hydroxide to increase yield.

BACKGROUND OF THE INVENTION

Typically, corn starch is removed from the protein of a corn kernel using a causative agent such as sulfur dioxide, sodium hydroxide, protease, or sodium carbonate. Glycosides are quite stable to base, however peeling reactions do occur with agents having a high pH at extended periods of time. While these agents extract the starch from the protein, several deficiencies exists that limit the yield of starch extracted.

For example, the use of sulfur dioxide, which is naturally acidic, create hydrolysis based on close contact with glycosidic linkages. Extraction with sulfur dioxide is also time consuming, requiring between 24 to 60 hours. Sulfur dioxide also contributes to ground contamination.

Sodium hydroxide requires a period of approximately four hours for extraction, but like sulfur dioxide, it has a pH level of 13 or above which leads to degradation and reduced yields. Sodium carbonate has a lower pH level of 10 to 11.5. While this reduces degradation, problems with separation of the starch from the protein at lower pH levels occur that limit yield.

Accordingly, there exists a need in the art for a method of extracting starch from corn that addresses these deficiencies.

An object of the present invention is to provide a method of extracting starch from corn that is less time consuming.

These and further objects will be apparent to those skilled in the art based on the following written description.

SUMMARY OF THE INVENTION

A method of extracting starch from corn. The method comprises steeping ground corn in a mixture of ammonium hydroxide and water, for a period of between 45 minutes and 20 hours wherein the mixture has a pH level between about 11.3 and 11.4. This method provides the advantage of extracting starch from corn with higher yields in less time.

DETAILED DESCRIPTION OF THE PREFERRED EMBODIMENT

Figure 1:
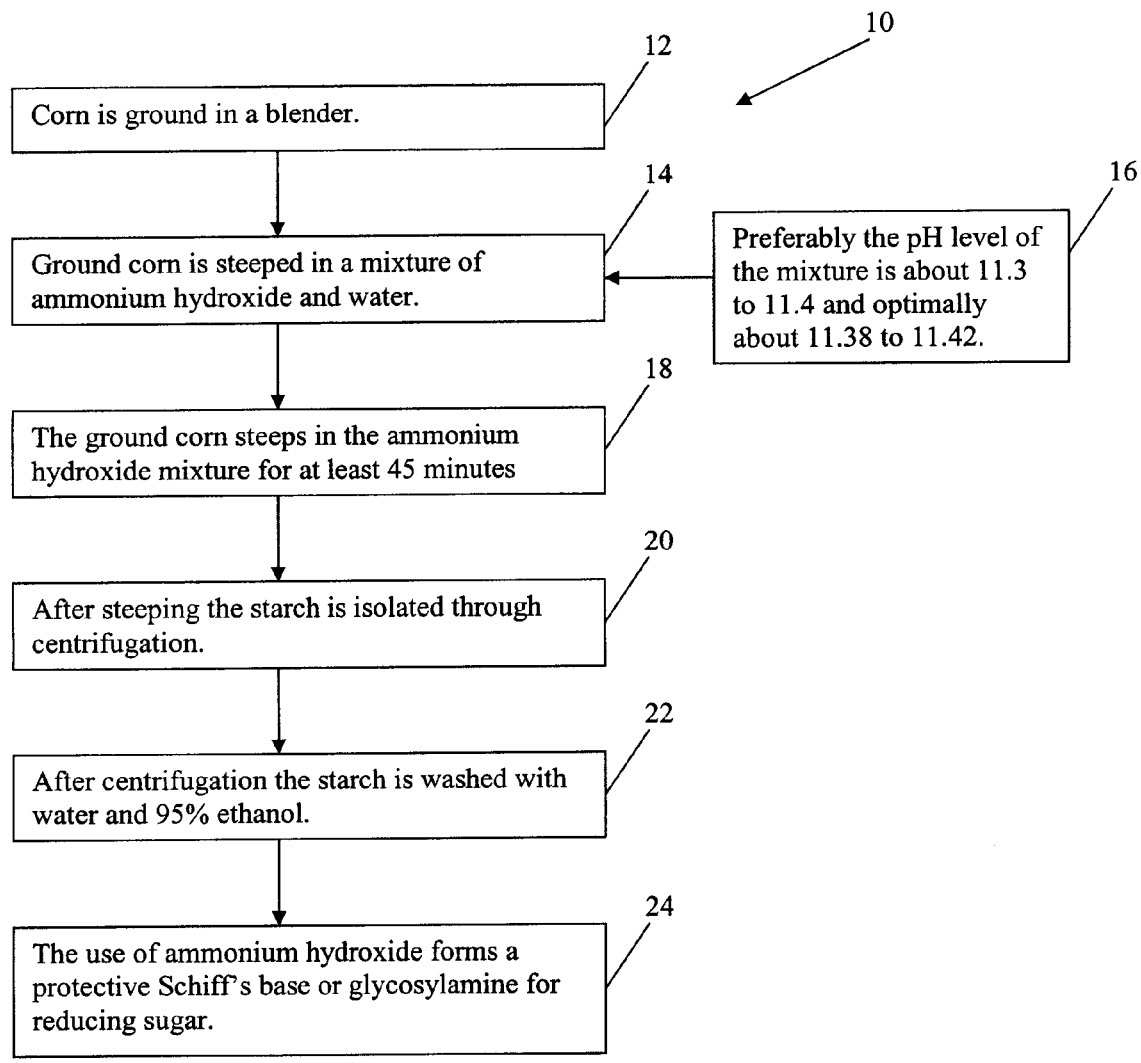
FIG. 1 is a flow chart of the method.

With reference to FIG. 1, a method of extracting starch from corn is presented at 10 to extract starch from corn initially the corn is ground in a blender at step 12. Once ground, the corn is steeped in a mixture of ammonium hydroxide and water at step 14. Preferably, the pH level of the mixture is about 11.3 to 11.4 and optimally at about 11.4±0.02 at step 16. The ground corn steeps in the ammonium hydroxide mixture for at least 45 minutes at step 18. After steeping the starch is isolated through centrifugation at step 20 and then washed with water and 95% ethanol at step 22. The use of ammonium hydroxide forms a protective Schiff's base or glycosylamine for the reducing sugar at step 24.

Figure 2:
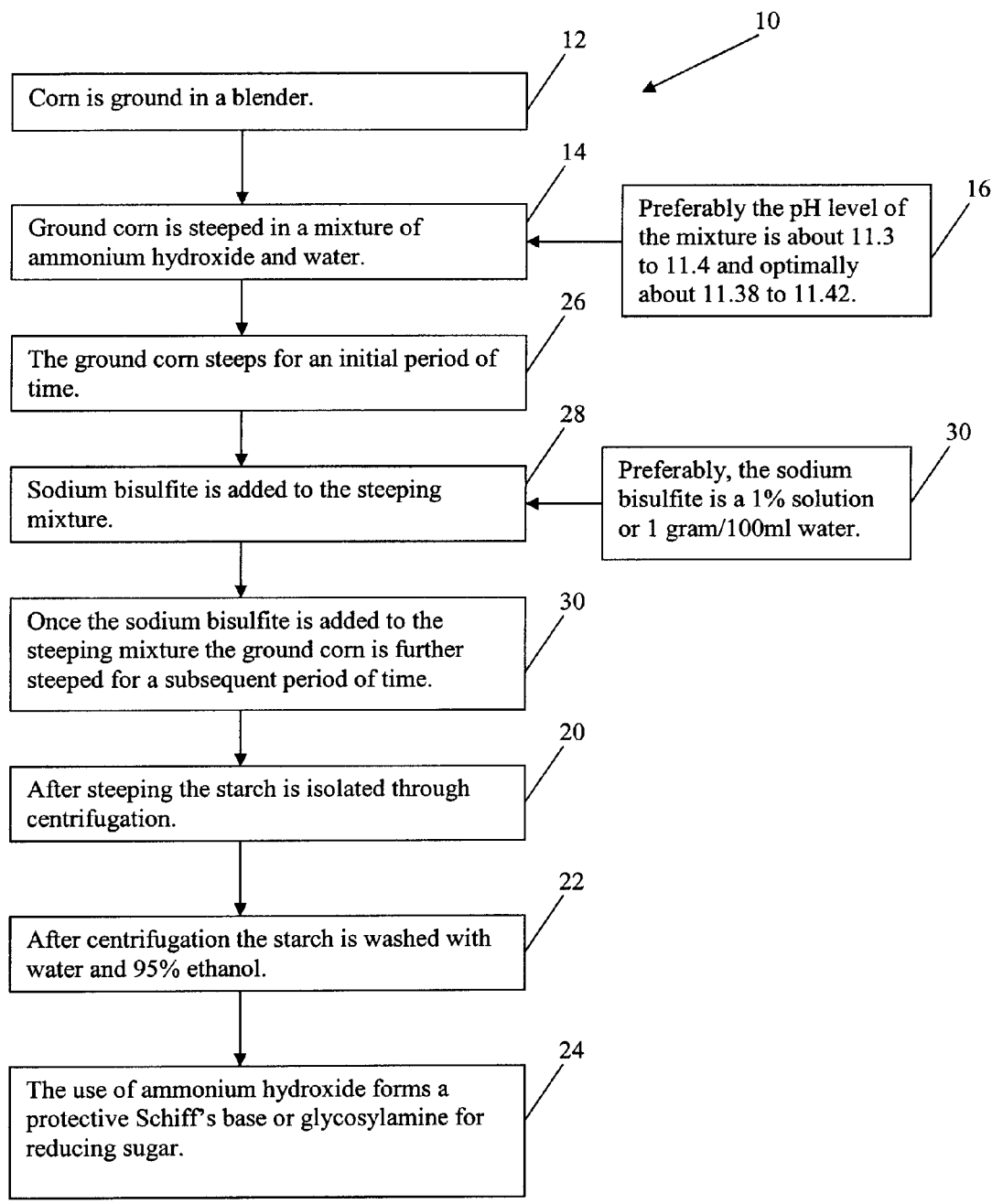
FIG. 2 is a flow chart of the method with the additional step of adding sodium bisulfite.

With reference to FIG. 2, in an alternative method, after the ground corn has steeped for an initial period of time at step 26, sodium bisulfite is added to the steeping mixture at step 28. Once added, the ground corn is further steeped for a subsequent period of time at step 30. Preferably, the sodium bisulfite is a 1% solution or 1 gram/100 ml water at step 32. The two methods have both produced a higher yield of starch extraction from corn as compared to processes using other causative agents. For example, as set forth in the table below, corn treated with ammonium hydroxide at a pH level of 11.3 for 45 minutes produced a yield of 11% more than corn treated under the same conditions using sodium hydroxide.

|  | A | B | C |
| --- | --- | --- | --- |
| pH | 11.3 | 11.6 | 11.3 |
| Time | 45 min. | 45 min. | 20 hrs. |
| Ammonium Hydroxide Yield | 1.11 | 1.07 | 1.27 |
| Sodium Hydroxide Yield | 1.0 | 1.0 | 1.0 |

When the pH level was increased to 11.6, at 45 minutes, the process using ammonium hydroxide produced a yield 7% greater than the process using sodium hydroxide. Finally, when the steeping time was increased to twenty hours, at a pH level of 11.3, the ammonium hydroxide treatment produced a yield 27% greater than the yield produced using the sodium hydroxide treatment.

The addition of sodium bisulfite produced even higher yields. For example, as shown in the table below, when the ground corn was steeped for an initial 50 minute period in ammonium hydroxide at an 11.7 pH level and then sodium bisulfite was added and the ground corn was steeped for a subsequent period of 24 hours, the starch yield was 35% greater than a treatment using ammonium hydroxide under the same conditions. When the subsequent steeping period was extended to 45 hours the yield using ammonium hydroxide and sodium bisulfite mixture was 63% greater than a treatment using ammonium hydroxide under the same conditions. Thus, the use of ammonium hydroxide as a causative agent in the extraction of starch from corn produces higher yields in less time than conventional agents.

| A | B | C |
| --- | --- | --- |
| pH | 11.7 | 11.7 |
| Initial Time | 50 min. | 50 min. |
| Subsequent Time | 24 hours | 45 hours |
| Ammonium Hydroxide and Sodium Bisulfite Yield | 1.35 | 1.63 |
| Ammonium Hydroxide Yield | 1.0 | 1.0 |

It will be appreciated by those skilled in the art that other various modifications could be made to the device without parting from the spirit and scope of this invention. All such modifications and changes fall within the scope of the claims and are intended to be covered thereby.

What is claimed is:

1. A method of extracting starch from corn, comprising the step of:
   steeping ground corn in a mixture of ammonium hydroxide and water.

2. The method of claim 1 wherein the ground corn is steeped for a period of between about 45 minutes and 20 hours.

3. The method of claim 1 wherein the mixture has a pH level between about 11.3 and 11.4.

4. The method of claim 1 wherein the mixture has a pH level between about 11.38 and 11.42.

5. The method of claim 1 further comprising the steps of adding sodium bisulfite to the mixture after an initial steeping period, and then steeping for a subsequent time period.

6. The method of claim 5 wherein the sodium bisulfite is 1 gram per 1 ml of water.

* * * * *